(12) United States Patent
Hsieh

(10) Patent No.: US 9,211,676 B2
(45) Date of Patent: Dec. 15, 2015

(54) THREE-DIMENSIONAL PRINTING APPARATUS

(71) Applicants: XYZprinting, Inc., New Taipei (TW); Kinpo Electronics, Inc., New Taipei (TW); Cal-Comp Electronics & Communications Company Limited, New Taipei (TW)

(72) Inventor: Wen-Chieh Hsieh, New Taipei (TW)

(73) Assignees: XYZprinting, Inc., New Taipei (TW); Kinpo Electronics, Inc., New Taipei (TW); Cal-Comp Electronics & Communications Company Limited, New Taipei (TW)

( * ) Notice: Subject to any disclaimer, the term of this patent is extended or adjusted under 35 U.S.C. 154(b) by 40 days.

(21) Appl. No.: 14/166,863

(22) Filed: Jan. 29, 2014

(65) Prior Publication Data

US 2015/0158250 A1  Jun. 11, 2015

(30) Foreign Application Priority Data

Dec. 11, 2013  (TW) .............................. 102145614 A

(51) Int. Cl.
*B29C 41/22* (2006.01)
*B29C 67/00* (2006.01)

(52) U.S. Cl.
CPC ......... *B29C 67/0088* (2013.01); *B29C 67/0059* (2013.01)

(58) Field of Classification Search
CPC ..................... B29C 67/0059; B29C 67/0088
USPC ......... 425/225, 226, 375, 145, 150, 112, 113; 264/308
See application file for complete search history.

(56) References Cited

U.S. PATENT DOCUMENTS

| | | | |
|---|---|---|---|
| 6,722,872 B1 * | 4/2004 | Swanson et al. | ............... 425/225 |
| 8,419,996 B2 * | 4/2013 | Swanson et al. | ............... 264/308 |

* cited by examiner

*Primary Examiner* — Joseph S Del Sole
*Assistant Examiner* — Thukhanh T Nguyen
(74) *Attorney, Agent, or Firm* — Jianq Chyun IP Office

(57) ABSTRACT

A three-dimensional (3-D) printing apparatus includes a base, a printing head module and a control unit. The base includes a carrying surface and a guiding mechanism. The guiding mechanism extends along a long-axis direction of the base. The printing head module movably disposed on the guiding mechanism. The length of the base is greater than the length of the printing head module, such that the printing head module is suitable for moving relatively to the guiding mechanism. The control unit coupled to the base and the printing head module controls the printing head module to move relatively to the base according to extensional information of the digital 3-D model along the long-axis direction, such that the printing head module dispenses a material on the carrying surface to form a 3-D object when moving relatively to the base.

20 Claims, 3 Drawing Sheets

THREE-DIMENSIONAL PRINTING APPARATUS

CROSS-REFERENCE TO RELATED APPLICATION

This application claims the priority benefit of Taiwan application serial no. 102145614, filed on Dec. 11, 2013. The entirety of the above-mentioned patent application is hereby incorporated by reference herein and made a part of this specification.

BACKGROUND

1. Technical Field

The technical field generally relates to a printing apparatus. More particularly, the technical field relates to a three-dimensional printing apparatus.

2. Description of Related Art

Along with the progress in computer-aided manufacturing (CAM), manufacturers have developed the three-dimensional (3-D) printing technology to rapidly embody an original design concept. The 3-D printing technology is by meaning a collective term referring to a series of rapid prototyping (RP) techniques, and the basic principle is additive manufacturing, where a RP machine is used to form cross-sectional shapes of a workpiece in an X-Y plane through scanning, shift intermittently at a layer thickness in the Z coordinates, and ultimately form a 3-D objects. The 3-D printing technology is applicable regardless of the geometric shapes, and the RP technology produces excellent outputs in particular for complex parts, which significantly saves efforts and processing time. The 3-D printing technology is capable of presenting an object of a digital 3-D model designed by means of computer-aided design (CAD) software in less time for a user to touch and actually feel the geometry of the model, or even to test the assembling ability of the parts and possible functions.

In an existing 3-D printing apparatus that produces 3-D objects through utilizing said RP technique, construction material is dispensed onto the base by the printing head thereof. Afterward, follow-up processes such as drying and curing processes may be performed, so as to obtain the 3-D object. However, the size of the 3-D object printed by the 3-D printing apparatus is restricted to the size of the base, and a 3-D object greater than the base in size is still unable to be printed so far. As a result, the existing 3-D printing apparatus is inconvenient in terms of use and the 3-D objects they produce have limited variability and flexibility.

SUMMARY

Accordingly, the disclosure is directed to a three-dimensional (3-D) printing apparatus capable of printing a 3-D object which is greater in size.

The disclosure is directed to a three-dimensional (3-D) printing apparatus includes a base, a printing head module and a control unit. The base includes a carrying surface and a guiding mechanism. The guiding mechanism extends along a long-axis direction of the base. The printing head module movably disposed on the guiding mechanism. The length of the base is greater than the length of the printing head module, such that the printing head module is suitable for moving relatively to the guiding mechanism. The control unit is coupled to the base and the printing head module for controlling printing head module to form the 3-D object on the carrying surface according to related information of a digital 3-D model, wherein the related information includes an extensional information related to the long-axis direction, such that the control unit controls the printing head module to move relatively to the base according to the extensional information.

In view of the above, in the 3-D printing apparatus of the disclosure, the length of the base is greater than the length of the casing. Also, the printing head module is movably disposed on the base, such that the printing head module is configured to slide relatively to the base and dispense the material onto the base by layers when moving, so as to form a 3-D object. Thereby, the control unit of the 3-D printing apparatus controls the printing head module to move relatively to the base according to the extensional information of the 3-D printing apparatus, so as to extend the printing range of the printing head module. Therefore, the printing range of the 3-D printing apparatus is no longer confined within the range enclosed by the printing head module fixed on the base. Accordingly, the 3-D printing apparatus of the disclosure is capable of improving the variability and the flexibility of the 3-D objects printed thereby.

To make the aforementioned and other features and advantages of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
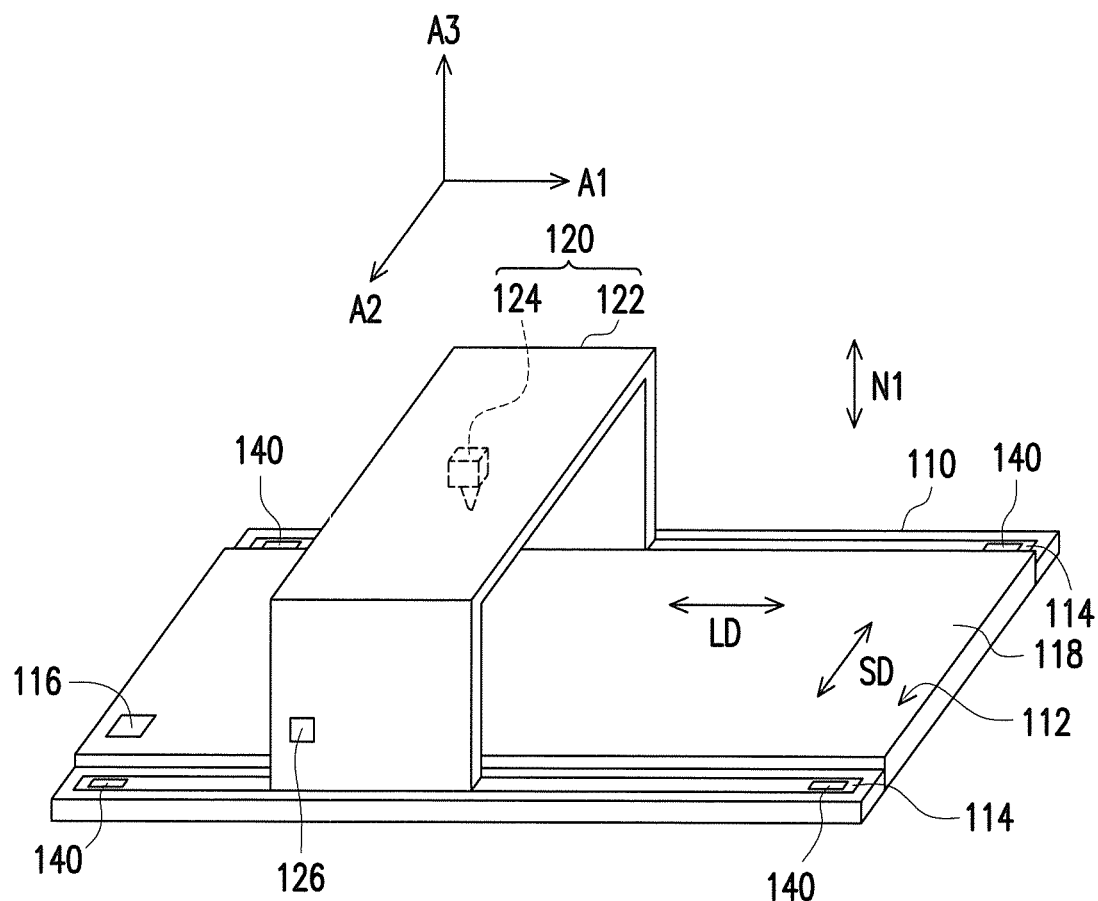
FIG. 1 is a schematic diagram illustrating a 3-D printing apparatus according to an exemplary embodiment.

Reference will now be made in detail to the present preferred embodiments of the disclosure, examples of which are illustrated in the accompanying drawings. Wherever possible, the same reference numbers are used in the drawings and the description to refer to the same or like parts.

It is to be understood that the foregoing and other detailed descriptions, features, and effects are intended to be described more comprehensively by providing embodiments accompanied with figures hereinafter. In the following embodiments, wording used to indicate directions, such as "up," "down," "front," "back," "left," and "right," merely refers to directions in the accompanying drawings. Therefore, the directional wording is used to illustrate rather than limit the disclosure. Moreover, the same or similar reference numerals represent the same or similar elements in the following embodiments.

Figure 2:
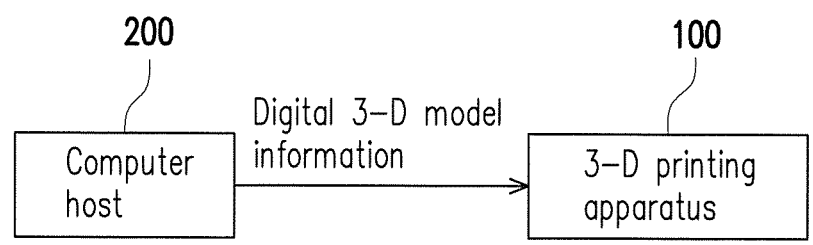
FIG. 2 is a schematic diagram illustrating an operating environment of a 3-D printing apparatus according to an exemplary embodiment.

FIG. 1 is a schematic diagram illustrating a 3-D printing apparatus according to an exemplary embodiment. FIG. 2 is a schematic diagram illustrating an operating environment of a 3-D printing apparatus according to an exemplary embodiment. Referring to FIG. 1 and FIG. 2, in the present embodiment, a 3-D printing apparatus 100 is capable of printing a 3-D object 10 according to a digital 3-D model. The 3-D printing apparatus 100 includes a base 110, a printing head module 120 and a control unit 130. In the present embodiment, the control unit 130 may serve to read a digital 3-D model. Here, the digital 3-D model may be a digital 3-D image file built by a computer host 200 by means of computer-aided design (CAD) or animation modeling software, for instance.

Figure 3:
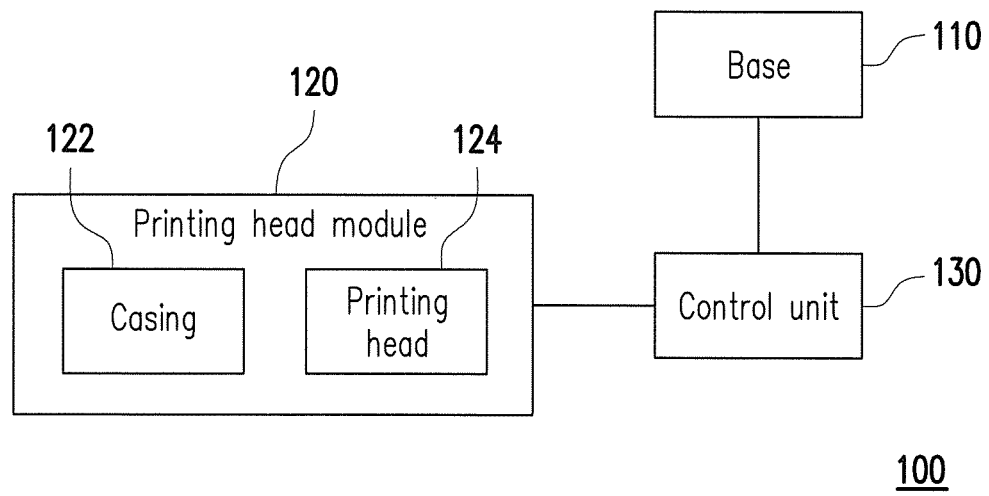
FIG. 3 is a block diagram illustrating a 3-D printing apparatus according to an exemplary embodiment.

FIG. 3 is a block diagram illustrating a 3-D printing apparatus according to an exemplary embodiment. Referring to FIG. 1 and FIG. 3, in the present embodiment, the base 110 of the 3-D printing apparatus 100 includes a carrying surface 112 and a guiding mechanism 114. In the present embodiment, the guiding mechanism 114 may be two sliding rails in pairs, disposed at two opposite sides of the carrying surface 112 respectively as shown in FIG. 1. The base 110 is configured to move along a normal direction N1 of the carrying surface 112. The guiding mechanism 114 is extended along a long axis direction LD of the base, and the printing head module 120 is movably disposed on the guiding mechanism 114. In the present embodiment, as shown in FIG. 1, the length of the base 110 along the long axis direction LD is greater than the length of the printing head module 120 along the long axis direction LD, such that the printing head module 120 is configured to slide back and forth along the guiding mechanism 114.

In detail, the printing head module 120 includes a casing 122 and at least one printing head 124. The casing is detachably disposed on the guiding mechanism 114, and the length of the base 11.0 along the long axis direction LD is greater than the length of the printing head module 120 along the long axis direction LD, so the casing 122 is configured to slide back and forth along the guiding mechanism 114 and move relatively to the base 110. In the present embodiment, rollers may be disposed at a surface of the casing 122 contacted with the guiding mechanism 114, so the casing 122 can slide along the guiding mechanism 114 through the rollers. Of course, the present disclosure is not limited thereto. In other embodiment, a bottom edge of the casing 122 contacted with the guiding mechanism 114 may also be structurally engaged with the guiding mechanism 114 without having the rollers disposed thereon, such that the casing 122 can slide relatively to the guiding mechanism 114. The printing head 124 is movably disposed in the casing 122, and configured to move parallel to the carrying surface 112. The control unit 130 is coupled to the base 110 and the printing head module 120 and configured to read and process the digital 3-D model. As such, the control unit 130 controls the printing head module 120 to move relatively to the base 110 according to a related information of the digital 3-D model, wherein the related information includes an extensional information related to the long-axis direction LD, so the printing head module 120 may dispense a material on the carrying surface 112 by layers according to the digital 3-D model while moving relatively to the base 110, so as to form a plurality of laminated layers. The laminated layers stacked on each other to form the 3-D object 10. To be more specific, the control unit 130 controls the casing 122 to move relatively to the base 110 along the guiding mechanism 114 according to the extensional information, and the printing head 124 dispenses the material on the carrying surface 112 according to the digital 3-D model while moving along with the casing, so as to form the 3-D object 10.

Figure 4:
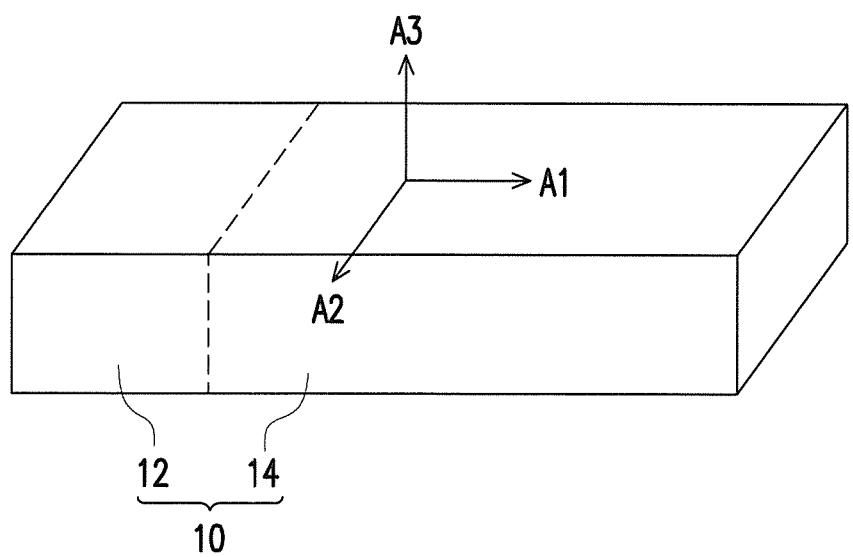
FIG. 4 is a schematic diagram depicting a 3-D object printed by a 3-D printing apparatus according to an exemplary embodiment.

FIG. 4 is a schematic diagram depicting a 3-D object printed by a 3-D printing apparatus according to an exemplary embodiment. Referring to FIG. 1 and FIG. 4, in the present embodiment, the related information of the digital 3-D model may include a first axis information, a second axis information and a third axis information respectively corresponding to a first axis A1, a second axis A2 and a third axis A3 of the 3-D object 10 printed by the 3-D printing apparatus 100. The first axis A1, the second axis A2 and the third axis A3 are perpendicular to each other as shown in FIG. 4, and the first axis information includes the extensional information described above. In the present embodiment, the first axis A1, the second axis A2 and the third axis A3 may respectively be the X-axis, Y-axis and Z-axis in X-Y-Z coordinates, and the first axis information, the second axis information and the third axis information may respectively be the information along the X-axis, Y-axis and Z-axis of the digital 3-D model related to the 3-D object 10. The control unit 130 reads the digital 3-D model to controls movement of the base 110, casing 122 and the printing head 124 respectively along the X-axis, Y-axis and Z-axis, and controls the printing head 124 to dispense the material on the carrying surface 112 by layers while moving to print the 3-D object 10.

In addition, in the case of the length of the 3-D object 10 along the first axis A1 exceeding the limit of the printing length of a regular printing head, the first axis information of the digital 3-D model related to the 3-D object may includes a standard information and the extensional information mentioned above, wherein the first axis information is, for example, the length of the digital 3-D model along the first axis A1. The 3-D object 10 printed according to related information of the digital 3-D model may includes a standard portion 12 related to the standard information and an extension portion 14 related to the extensional information. For example, the first axial information may be 20 centimetres (cm), and the standard information may be 5 cm, for instance. Namely, if the casing 122 is not moving, the limit of the printing length of the printing head 124 along the first axis A1 is 5 cm. Accordingly, the extensional information may be the remaining 15 cm, which is the printing length that the printing head 124 is capable of printing when the casing 122 moves relatively to the base. As such, after reading the digital 3-D model, the control unit 130 controls the movement of the printing head 124 according to the standard information to print out the standard portion 12 of the 3-D object 10, and controls the casing 122 to move relative to the base 110 and the movement of the printing head 124 according to the extensional information to print out the extension portion 14 of the 3-D object, and the printing of the 3-D object is complete.

For example, the control unit 130 controls the casing 122 to move along the guiding mechanism 114 according to the extensional information of the first axis information, and controls the movement of the base 110 along the normal direction N1 according to the third axis information. In the present embodiment, the first axis A1 may be, for example, parallel to the long axis direction LD of the base 110, and the third axis A3 may be, for example, parallel to the normal direction N1 of the base 110. Thereby, the control unit 130 controls the casing 122 to move along the guiding mechanism 114 parallel to the first axis A1 according to extensional information of the digital 3-D model, and controls the base 110 to move along the normal direction N1 parallel to the third axis A3 according to the third axis information. In the present embodiment, the 3-D printing apparatus 100 further includes a plurality of sensing components 140 disposed at terminal points of the guiding mechanism 114 respectively and coupled to the control unit 130, so as to detect the position of the casing 122 located on the guiding mechanism 114, such that the control unit 130 can control the movement of the casing 122 along the guiding mechanism 114 accordingly.

Moreover, the control unit 130 may further control the printing head 124 to move within the casing 122 along the long axis direction LD according to the first axis information, and controls the printing head 124 to move within the casing 122 along a short axis direction SD according to the second axis information, wherein the short axis direction SD is perpendicular to the long axis direction LD. Namely, the control unit 130 controls the printing head 124 to move within the casing 122 along the long axis direction LD parallel to the first axis A1 according to the first axis information, controls the printing head 124 to move within the casing 122 along the short axis direction SD parallel to the second axis A2 according to the second axis information, and controls the printing head 124 to dispense the material on the carrying surface 112 while moving, so as to form the 3-D object.

With the disposition, in the present embodiment, the length of the base 110 is designed to be greater than the length of the casing 122, and the casing 122 is movably disposed on the base 110, such that the printing head 124 disposed within the casing 122 can slide on the base 110 along with the casing 122, so as to extend the printing range of the printing head 124. Therefore, the printing range of the 3-D printing apparatus is no longer confined within the range enclosed by the casing 122 fixed on the base 110. Accordingly, the 3-D printing apparatus of the embodiment is capable of improving the variability and the flexibility of the 3-D object 10 printed thereby.

In addition, the base 110 may further include a lifting and lowering portion 118, wherein the carrying surface 112 is located on the lifting and lowering portion 118, and the two guiding mechanism 114 are disposed at two opposite sides of the lifting and lowering portion 118 as shown in FIG. 1 respectively. Therefore, the control unit 130 may control the base 110 to move along the normal direction N1 parallel to the third axis A3 according to the third axis information. Moreover, the base 110 may further includes a first connector 116 and the printing head module 120 may further includes a second connector 126. The first connector 116 and the second connector 126 are electrically connected to the control unit 130 respectively.

Figure 5:
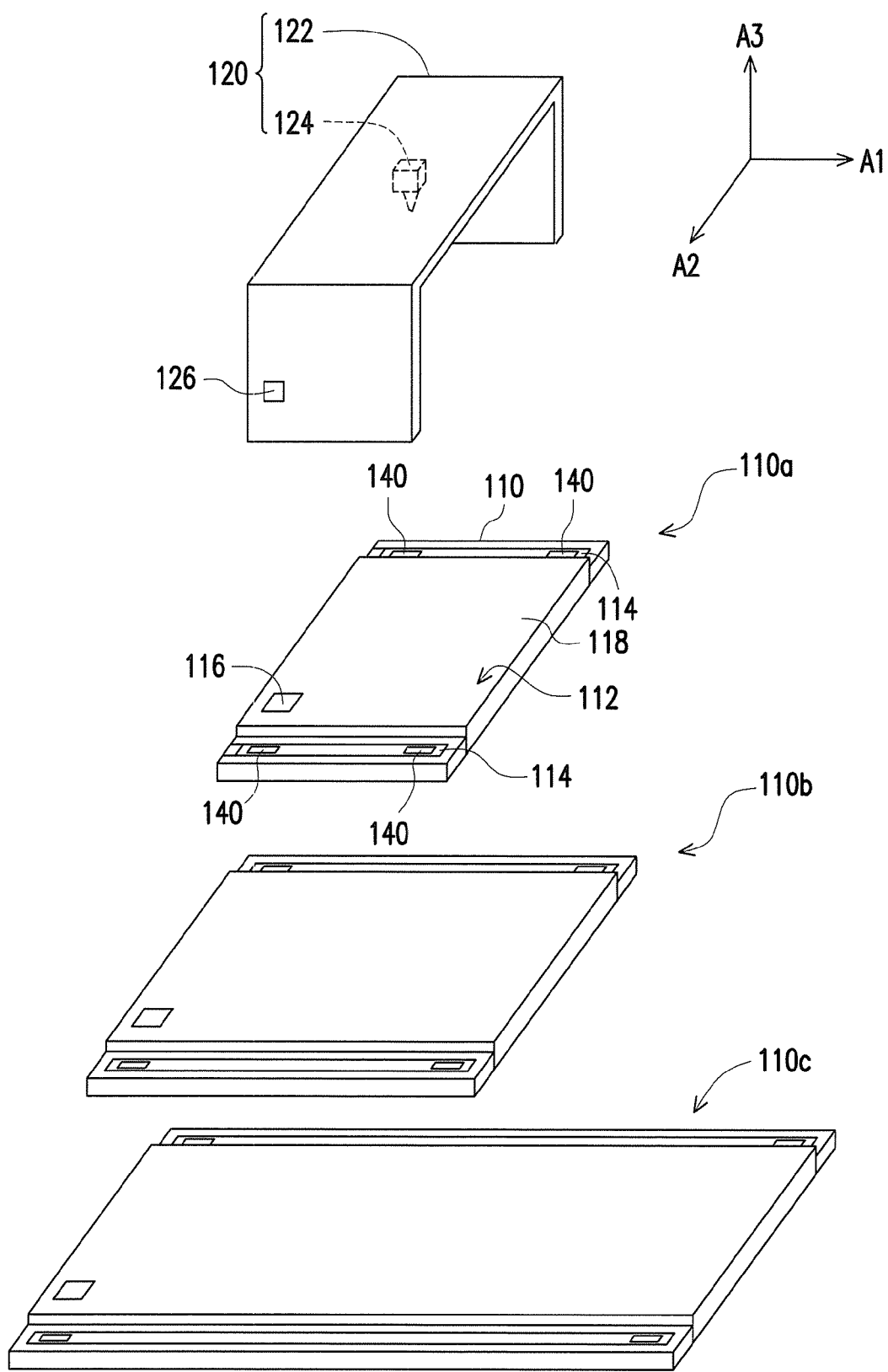
FIG. 5 is a schematic diagram illustrating a 3-D printing apparatus according to another exemplary embodiment

FIG. 5 is a schematic diagram illustrating a 3-D printing apparatus according to another exemplary embodiment. Referring to FIG. 5, in the present embodiment, the amount of the base 110 may be plural. That is to say, the 3-D printing apparatus 100 may includes a plurality of bases 110a, 110b and 110c as shown in FIG. 5, wherein the lengths of the bases 110a, 110b and 110c are different from each other and the length of each of the bases 110a, 110b and 110c is greater than or equal to the length of the printing head module 120 along the long axis direction LD. Therefore, a user may choose one of the bases 110a, 110b and 110c according to the required length of the base, required size of the 3-D object 10 to be printed or the first axis information of the digital 3-D model, such that the casing 122 can be slidingly disposed on the chosen base 110a, 110b or 110c. As such, the control unit 130 may be couple to the printing head module 120 and the chosen base 110a, 110b or 110c as it is described before, so as to control the movement of the printing head module 120 and the chosen base 110a, 110b or 110c according to the digital 3-D model to form the 3-D object.

In sum, in the 3-D printing apparatus of the disclosure, the length of the base is greater than the length of the casing. Also, the printing head module is movably disposed on the base, such that the printing head module is configured to slide relatively to the base and dispense the material onto the base by layers when moving, so as to form a 3-D object. Thereby, the control unit of the 3-D printing apparatus controls the printing head module to move relatively to the base according to the extensional information of the 3-D printing apparatus, so as to extend the printing range of the printing head module. Therefore, the printing range of the 3-D printing apparatus is no longer confined within the range enclosed by the printing head module fixed on the base. Accordingly, the 3-D printing apparatus of the disclosure is capable of improving the variability and the flexibility of the 3-D object printed thereby.

In addition, the 3-D printing apparatus of the disclosure may further include a plurality of bases with different lengths for a user to choose from. The user may choose one the bases according to the required length of the base or required size of the 3-D object 10 to be printed, such that the printing head module can be slidingly disposed on the chosen base. As such, the control unit is configured to control the movement of the printing head module and the chosen base according to the digital 3-D model to perform printing task, so as to improve the variability and the flexibility of the 3-D objects printed by the 3-D printing apparatus.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A three-dimensional printing apparatus, capable of dispensing a material by layers to form a three-dimensional object, the three-dimensional printing apparatus comprising:
   a base, comprising a carrying surface and a guiding mechanism, the guiding mechanism extending along a long-axis direction of the base;
   a casing, detachably disposed on the guiding mechanism and configured to move relatively to the base along the guiding mechanism, wherein the length of the base is greater than the length of the casing along the long-axis direction, such that the casing is suitable for moving relatively to the guiding mechanism;
   at least one printing head, movably disposed in the casing; and
   a control unit, coupled to the base, the casing and the at least one printing head for controlling the at least one printing head dispensing the material to form the three-dimensional object on the carrying surface according to a related information of a digital three-dimensional model, wherein the related information comprising an extensional information related to the long-axis direction, and the control unit controls the casing to move relatively to the base according to the extensional information.

2. The three-dimensional printing apparatus as claimed in claim 1, wherein the related information comprises standard information and the extensional information.

3. The three-dimensional printing apparatus as claimed in claim 1, wherein the related information comprises a first axis information, a second axis information and a third axis information, corresponding to a first axis, a second axis and a third axis of the three-dimensional object respectively, wherein the first axis information comprises the extensional information.

4. The three-dimensional printing apparatus as claimed in claim 1, wherein the control unit controls the casing to move along the guiding mechanism according to the extensional information and controls the base to move along a normal direction of the carrying surface according to the third axis information.

5. The three-dimensional printing apparatus as claimed in claim 1, wherein the base further comprises a first connector for electrically connecting the control unit.

6. The three-dimensional printing apparatus as claimed in claim 1, wherein the casing further comprises a second connector for electrically connecting the control unit.

7. The three-dimensional printing apparatus as claimed in claim 1, wherein the base further comprises a lifting and lowering portion, the carrying surface is located on the lifting and lowering portion, the guiding mechanism is disposed at two opposing sides of the lifting and lowering portion, the control unit controls the lifting and lowering portion to move along a normal direction of the carrying surface according to the digital three-dimensional model.

8. The three-dimensional printing apparatus as claimed in claim 1, further comprises a plurality of sensing components, disposed at terminal points of the guiding mechanism respectively.

9. The three-dimensional printing apparatus as claimed in claim 1, wherein the amount of the base is plural, the printing head is movably disposed on one of the bases.

10. The three-dimensional printing apparatus as claimed in claim 1, wherein the lengths of the bases along the long-axis direction are different from each other, and are greater or equal to the length of the casing along the long-axis direction.

11. The three-dimensional printing apparatus as claimed in claim 1, wherein the guiding mechanism comprises two sliding rails in pairs, disposed at two opposite sides of the carrying surface respectively.

12. A three-dimensional printing apparatus, capable of dispensing a material by layers to form a three-dimensional object, the three-dimensional printing apparatus comprising:
   a base, comprising a carrying surface and a guiding mechanism, the guiding mechanism extending along a long-axis direction of the base;
   a printing head module, movably disposed on the guiding mechanism, wherein the printing head module comprising at least one printing head and the length of the base is greater than the length of the printing head module along the long-axis direction, such that the printing head module is suitable for moving relatively to the guiding mechanism; and
   a control unit, coupled to the base, the printing head module and the at least one printing head for controlling the printing head module dispensing the material to form the three-dimensional object on the carrying surface according to a related information of a digital three-dimensional model, wherein the related information comprising a standard information and an extensional information related to the long-axis direction, and the control unit controls the at least one printing head dispensing the material on the carrying surface according to the standard information and controls the printing head module to move relatively to the base according to the extensional information.

13. The three-dimensional printing apparatus as claimed in claim 12, wherein the control unit controls the printing head module to move along the guiding mechanism according to the extensional information and controls the base to move along a normal direction of the carrying surface according to the third axis information.

14. The three-dimensional printing apparatus as claimed in claim 12, wherein the base further comprises a first connector for electrically connecting the control unit.

15. The three-dimensional printing apparatus as claimed in claim 12, wherein the printing head module further comprises a second connector for electrically connecting the control unit.

16. The three-dimensional printing apparatus as claimed in claim 12, wherein the base further comprises a lifting and lowering portion, the carrying surface is located on the lifting and lowering portion, the guiding mechanism is disposed at two opposing sides of the lifting and lowering portion, the control unit controls the lifting and lowering portion o move along a normal direction of the carrying surface according to the digital three-dimensional model.

17. The three-dimensional printing apparatus as claimed in claim 12, further comprises a plurality of sensing components, disposed at terminal points of the guiding mechanism respectively.

18. The three-dimensional printing apparatus as claimed in claim 12, wherein the amount of the base is plural, the printing head is movably disposed on one of the bases.

19. The three-dimensional printing apparatus as claimed in claim 12, wherein the lengths of the bases along the long-axis direction are different from each other, and are greater or equal to the length of the printing head module along the long-axis direction.

20. The three-dimensional printing apparatus as claimed in claim 12, wherein the guiding mechanism comprises two sliding rails in pairs, disposed at two opposite sides of the carrying surface respectively.

* * * * *